S. GOODMAN.
HEATING DEVICE.
APPLICATION FILED FEB. 14, 1919.
1,343,670.
Patented June 15, 1920.
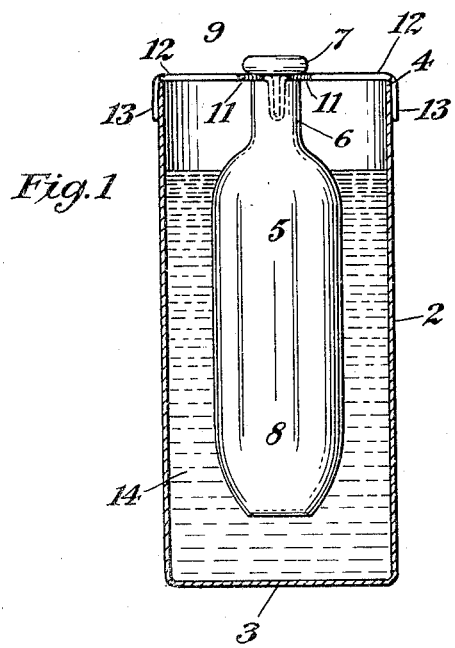
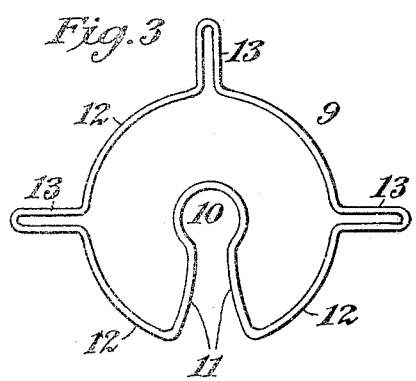
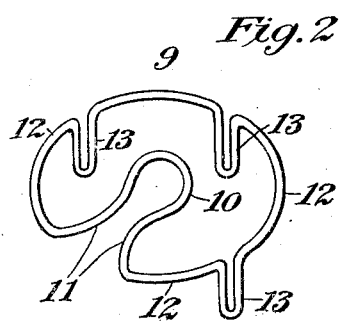
Inventor
Samuel Goodman
By his Attorney
Charles D. King.

UNITED STATES PATENT OFFICE.

SAMUEL GOODMAN, OF BROOKLYN, NEW YORK.

HEATING DEVICE.

1,343,670.  Specification of Letters Patent.  Patented June 15, 1920.

Application filed February 14, 1919. Serial No. 277,121.

*To all whom it may concern:*

Be it known that I, SAMUEL GOODMAN, a citizen of the United States, and a resident of Brooklyn, in the county of Kings and State of New York, have invented certain new and useful Improvements in Heating Devices, of which the following is a specification.

This invention relates to heating devices and particularly to devices for heating foods and other substances. Its main object is to provide means for heating such substances over a hot water or other liquid bath by means of which the temperature of the substance to be heated is kept below a certain maximum to prevent changing of its chemical composition.

Among the substances which it is desirable at times to treat in this manner is milk, particularly milk for feeding young children, and the invention provides especially advantageous and convenient means whereby the milk intended to be fed to infant children can be heated easily and in a sanitary manner without danger of bringing it too near the boiling point. Other food substances and delicate materials can be heated in apparatus embodying the invention and the drawing accompanying and forming part of this specification while showing an apparatus particularly adapted for the heating of milk in an improved manner is to be understood as illustrative merely of one way in which the invention can be worked.

Figure 1 of the drawing is a vertical sectional view of an apparatus embodying my invention.

Fig. 2 is a perspective view of a clamping or clasping and supporting member forming part of my invention and Fig. 3 is a plan of said clamping and supporting member showing certain parts straightened out.

Similar characters refer to similar parts in all figures of the drawing.

Referring to Fig. 1, the numeral 2 designates a vessel adapted for holding and heating a suitable liquid in which a second vessel to be heated can be placed. Ordinarily hot water is the liquid used in the heating of such substances as milk, and the vessel 2 is thus constituted as a hot water bath for the inner vessel and is conveniently made of any suitable shape such as cylindrical. It is here shown made in that form and any suitable material may be used for the same such as sheet tin or copper, or hard fiber sides with tin or copper bottom.

The bottom 3 of the vessel 2 is preferably flat so that it can be readily placed upon a gas, oil or other stove or any suitable heater. It may be convenient to have the rim or upper edge 4 of the vessel 2 provided with a bead or flange (not shown) for the purpose of strengthening the upper part of the cylindrical wall, as said rim forms the support for the remainder of the device.

In the form of the invention shown in the drawing, the vessel for holding the substance, such as milk, to be heated, is in the form of a bottle, which is a very convenient vessel for containing such liquids. The numeral 5 designates the bottle or vessel, 6 its neck, 7 its rim or flange, and 8 its lower portion.

Suitable means are provided to support the bottle or vessel 5 on the vessel 2. Such means consist of a clasping or clamping member 9 which is arranged to fit the neck 6 of the vessel 5 under the flange or rim 7 such as by a portion 10 passing around under said flange 7 and connected by portions 11 to a peripheral part 12 adapted to rest on the rim 4 of the vessel 2. Suitable means are provided for centering the member 9, such as by means of lugs or ears 13 bent down as shown in Figs. 1 and 2, and of any suitable number.

In operation, the neck 6 of a vessel 5 is pushed into place by passing it between the portions 11 until it seats in the part 10, the portions 11 forming a pass through which it cannot go unless smartly pressed. The member 9 is therefore now firmly held on the bottle neck by the spring of the wire of which it is made, and the bottle and member 9 are now passed downward so that the lower part 8 is in the liquid 14 in the vessel 2, while the member 9 is seated on the flange or rim 4. On heat being applied to the bottom 3 of the vessel 2, the milk or other substance in the vessel 5 can be properly warmed without overheating and thereby changing its chemical composition. As the portions 11 usually have some resilience in a downward and upward direction as well as laterally, the bottle or vessel 5 is yieldingly held or suspended by the member 9, and is centrally held or suspended by reason of the position of the portion 10 in relation to the peripheral portion 12.

What I claim is:—

1. In a device of the class described, the combination with an open vessel for heating liquid, of a member adapted to hold a bottle suspended in said vessel, which member includes circumferential portions adapted to rest on the rim of the vessel, means to locate said circumferential portions in position thereon which means are intermediate of said portions, and a portion extending from the circumferential portions toward the center of the device and which extending portion is effective to clasp the neck of the bottle.

2. In a device of the class described, the combination with an open vessel for heating liquid, of a member adapted to hold a bottle in the liquid in said vessel, which member includes an outer annular portion adapted to rest on the rim of the vessel, means to locate said annular portion on said rim, and means to clasp the neck of a bottle which embody an inner annular portion and two portions extending therefrom to the outer annular portion.

Signed at New York, in the county of New York and State of New York, this 8th day of Febry., A. D. 1919.

SAMUEL GOODMAN.